US012792315B2

(12) United States Patent
Le Corre

(10) Patent No.: US 12,792,315 B2
(45) Date of Patent: Nov. 10, 2026

(54) LIVE VISUAL FEEDBACK ON SOURCE CODE GENERATION

(71) Applicant: STMicroelectronics International N.V., Geneva (CH)

(72) Inventor: Pierre Le Corre, Liffré (FR)

(73) Assignee: STMicroelectronics International N.V., Geneva (CH)

( * ) Notice: Subject to any disclaimer, the term of this patent is extended or adjusted under 35 U.S.C. 154(b) by 550 days.

(21) Appl. No.: 18/458,944

(22) Filed: Aug. 30, 2023

(65) Prior Publication Data

US 2025/0077193 A1 Mar. 6, 2025

(51) Int. Cl.
*G06F 9/44* (2018.01)
*G06F 8/33* (2018.01)
*G06F 40/109* (2020.01)
*G06F 40/194* (2020.01)

(52) U.S. Cl.
CPC .............. *G06F 8/33* (2013.01); *G06F 40/109* (2020.01); *G06F 40/194* (2020.01)

(58) Field of Classification Search
CPC .......................................................... G06F 8/33
USPC ........................................................... 717/106
See application file for complete search history.

(56) References Cited

U.S. PATENT DOCUMENTS 6,993,710 B1 * 1/2006 Coad ......................... G06F 8/77 715/767
7,661,064 B2 * 2/2010 Cicerone ............... G06F 40/194 715/255
7,849,440 B1 * 12/2010 Englehart ................. G06F 8/34 717/109
8,990,773 B2 3/2015 Amano et al.
9,052,983 B2 * 6/2015 Farchi ........................ G06F 8/71
9,582,400 B1 * 2/2017 Bienkowski .......... G06F 3/0489
9,600,275 B2 * 3/2017 Fan ........................... G06F 8/73
9,773,264 B2 9/2017 Brown et al.
10,783,055 B2 9/2020 Raviv et al.
2020/0004518 A1 1/2020 Ryall et al.

OTHER PUBLICATIONS

"Web Live Preview (Preview)," retrieved from https://marketplace.visualstudio.com/items?itemName=WebToolsTeam.WebLivePreview, on Jun. 14, 2023, 2 pages.
Genuitec, "Live Preview & CodeLive for Fast Web Development," retrieved from https://www.genuitec.com/tech/live-preview/, on Jun. 14, 2023, 8 pages.

* cited by examiner

*Primary Examiner* — Evral E Bodden
(74) *Attorney, Agent, or Firm* — Seed IP Law Group LLP

(57) ABSTRACT

A method of facilitating live feedback on code generation includes generating first source code based on user configuration, presenting the generated first source code in a live preview user interface, and obtaining a change to the user configuration. The method also includes, responsive to the obtaining of the first change: generating second source code based on the first change; computing differences between the second source code and the first source code; and presenting the second source code in the live preview user interface by: visually signaling a correspondence between the first change and portions of the second source code that are associated with the differences; and visually distinguishing the portions of the second source code from other portions of the second source code.

21 Claims, 9 Drawing Sheets

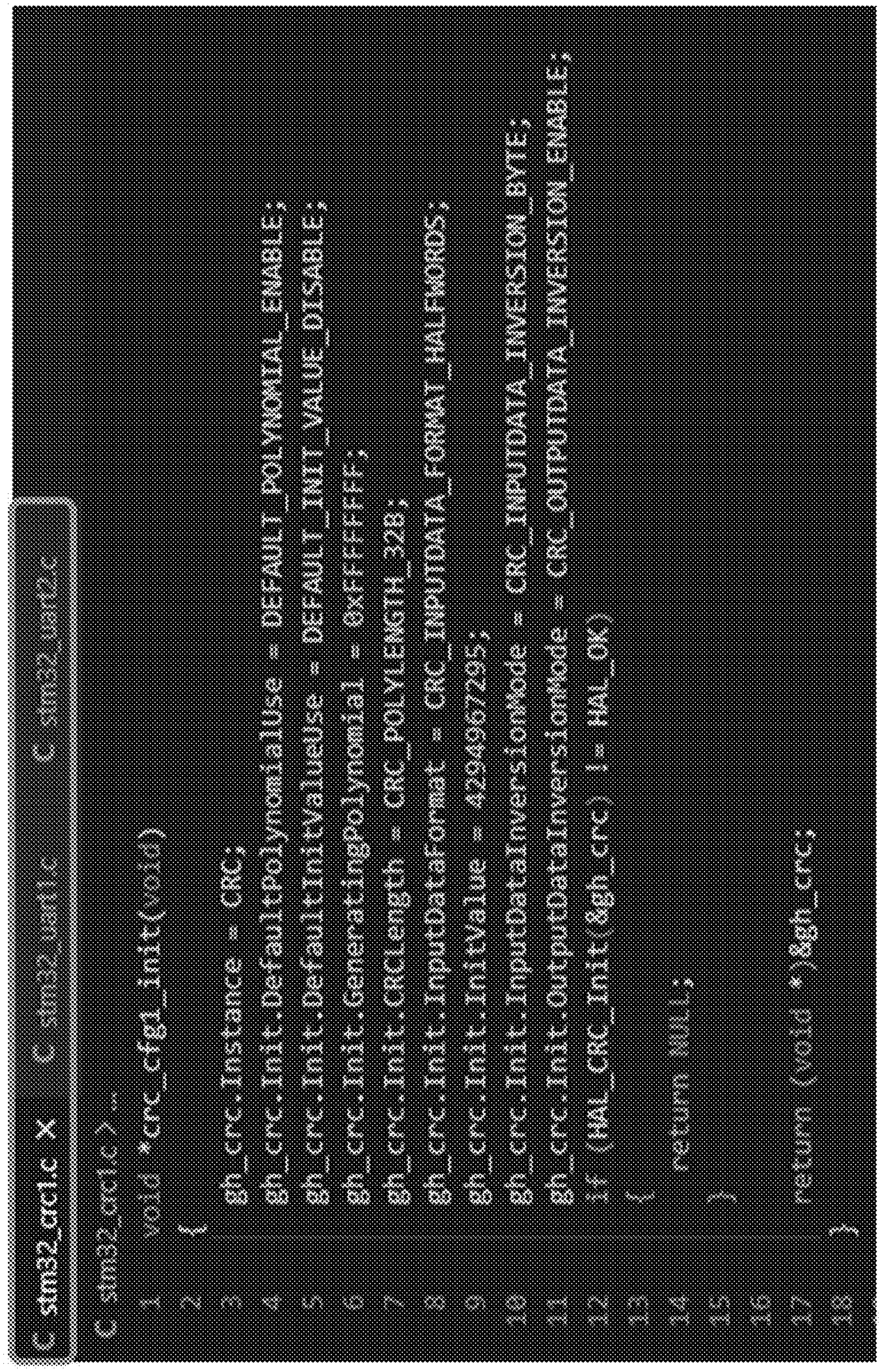

```
C stm32_crc1.c X   C stm32_uart1.c   C stm32_uart2.c
C stm32_crc1.c > ...
void *crc_cfg1_init(void)
{
    gh_crc.Instance = CRC;
    gh_crc.Init.DefaultPolynomialUse = DEFAULT_POLYNOMIAL_ENABLE;
    gh_crc.Init.DefaultInitValueUse = DEFAULT_INIT_VALUE_DISABLE;
    gh_crc.Init.GeneratingPolynomial = 0xFFFFFFFF;
    gh_crc.Init.CRCLength = CRC_POLYLENGTH_32B;
    gh_crc.Init.InputDataFormat = CRC_INPUTDATA_FORMAT_HALFWORDS;
    gh_crc.Init.InitValue = 4294967295;
    gh_crc.Init.InputDataInversionMode = CRC_INPUTDATA_INVERSION_BYTE;
    gh_crc.Init.OutputDataInversionMode = CRC_OUTPUTDATA_INVERSION_ENABLE;
    if (HAL_CRC_Init(&gh_crc) != HAL_OK)
    {
        return NULL;
    }

    return (void *)&gh_crc;
}
```

FIG. 7

LIVE VISUAL FEEDBACK ON SOURCE CODE GENERATION

BACKGROUND

Technical Field

The present disclosure relates to the field of computer programming and human-computer interaction. The present disclosure relates more particularly to source code generation and real-time visual feedback.

Description of the Related Art

Source code generation tools can allow programmers or other users to inspect user code as it is being generated or compiled. They can generate code based on user configuration and introduce new source files to the user's assembly on the fly. A user can then generate code that executes while compiling.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Source code generators can provide source code to end user based on choices, parameters, data sources, or other user configuration made via a graphical user interface (GUI). However, it can be difficult for an end user to understand how a user configuration made via the GUI affects relevant source code file(s) in text format. Embodiments of technologies described in the preset disclosure are directed to providing instantaneous or real-time feedback of impacts to source code generation caused by user configuration, thereby improving programming efficiency and flexibility via a novel framework of human-computer interactions.

Embodiments of the present disclosure provide a computer-implemented method of facilitating live feedback on code generation. The method includes: generating first source code based on at least one user configuration for code generation made via a configuration user interface; presenting the generated first source code in a live preview user interface; and obtaining, via the configuration user interface, a first change to the at least one user configuration for code generation. The method also includes responsive to the obtaining of the first change to the at least one user configuration: generating second source code based on the first change to at least one user configuration for code generation; computing one or more differences between the second source code and the first source code; and presenting the second source code in the live preview user interface by: visually signaling a correspondence between the first change to the at least one user configuration for code generation and one or more portions of the second source code that are associated with the one or more differences between the second source code and the first source code; and visually distinguishing the one or more portions of the second source code that are associated with the one or more differences between the second source code and the first source code from other portions of the second source code.

Embodiments of the present disclosure provide a non-transitory computer-readable medium storing contents that cause one or more processors to perform actions. The actions include: generating first source code based on at least one user configuration for code generation made via a configuration user interface; presenting the generated first source code in a live preview user interface; and obtaining, via the configuration user interface, a first change to the at least one user configuration for code generation. The actions also include responsive to the obtaining of the first change to the at least one user configuration: generating second source code based on the first change to at least one user configuration for code generation; computing one or more differences between the second source code and the first source code; and presenting the second source code in the live preview user interface by: visually signaling a correspondence between the first change to the at least one user configuration for code generation and one or more portions of the second source code that are associated with the one or more differences between the second source code and the first source code; and visually distinguishing the one or more portions of the second source code that are associated with the one or more differences between the second source code and the first source code from other portions of the second source code.

Embodiments of the present disclosure provide a system including one or more processors and a computing device coupled to the one or more processors and configured to perform actions. The actions include: generating first source code based on at least one user configuration for code generation made via a configuration user interface; presenting the generated first source code in a live preview user interface; and obtaining, via the configuration user interface, a first change to the at least one user configuration for code generation. The actions also include responsive to the obtaining of the first change to the at least one user configuration: generating second source code based on the first change to at least one user configuration for code generation; computing one or more differences between the second source code and the first source code; and presenting the second source code in the live preview user interface by: visually signaling a correspondence between the first change to the at least one user configuration for code generation and one or more portions of the second source code that are associated with the one or more differences between the second source code and the first source code; and visually distinguishing the one or more portions of the second source code that are associated with the one or more differences between the second source code and the first source code from other portions of the second source code.

BRIEF DESCRIPTION OF THE SEVERAL VIEWS OF THE DRAWINGS

FIG. 7 shows an example of displaying multiple source code files in sub-contexts of the live preview user interface, according to some embodiments.

DETAILED DESCRIPTION

Figure 1:
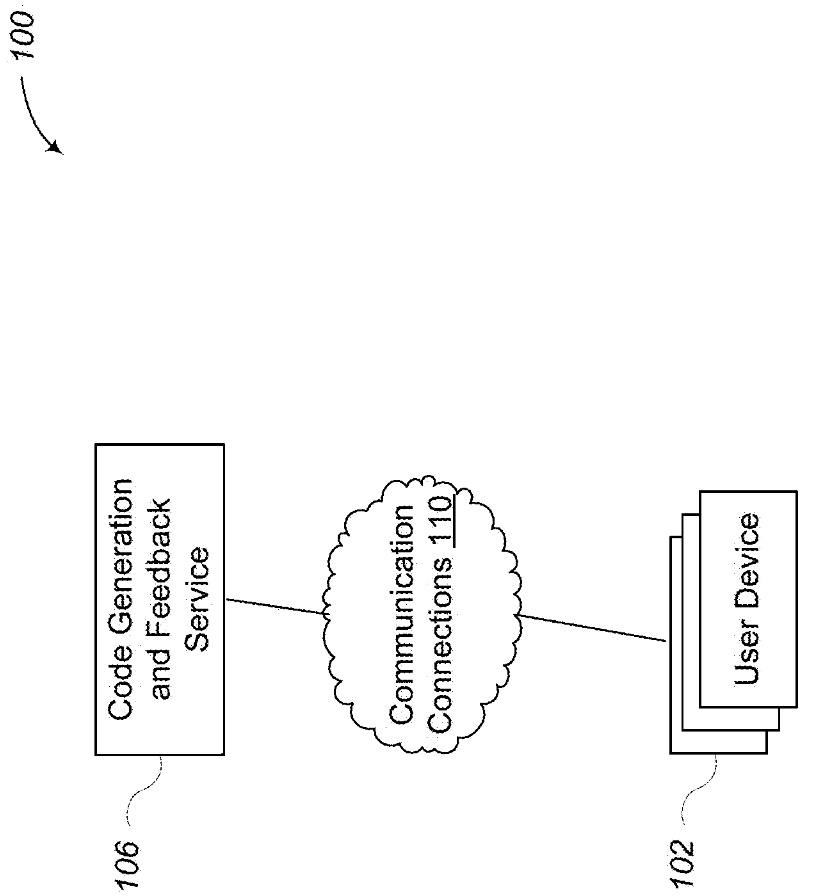
FIG. 1 is a block diagram of a networked environment for source code generation and feedback, according to some embodiments.

FIG. 1 is a block diagram of a networked environment 100 for source code generation and feedback, according to some embodiments. The environment 100 includes one or more user devices 102, which may be used by programmers, system developers, or other users to communicate with a code generation and feedback service 106. Examples of a user device 102 include a personal computer, workstation, notebook computer, server, tablet computer, smart phone, smart watch, or other portable or non-portable computing device.

In some embodiments, a user device 102 may communicate with the code generation and feedback service 106 via communication connections 110. The communication connections 110 may include one or more computer networks, one or more wired or wireless networks, satellite transmission media, one or more cellular networks, or some combination thereof. The communication connections 110 may include a publicly accessible network of linked networks, possibly operated by various distinct parties, such as the Internet. The communication connections 110 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the communication connections 110 may include various types of wired and/or wireless networks in various situations, including satellite transmission. In addition, the communication connections 110 may include one or more communication interfaces including radio frequency (RF) transceivers, cellular communication interfaces and antennas, universal serial bus (USB) interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces or the like.

In some embodiments, the code generation and feedback service 106 can be cloud-based or otherwise implemented in a software and/or hardware form on one or more remote computing devices including a computer, mobile device, tablet computer, smart phone, handheld computer, and/or workstation, etc. In some embodiments, the code generation and feedback service 106 is implemented partially or entirely on one or more user devices 102.

Figure 2:
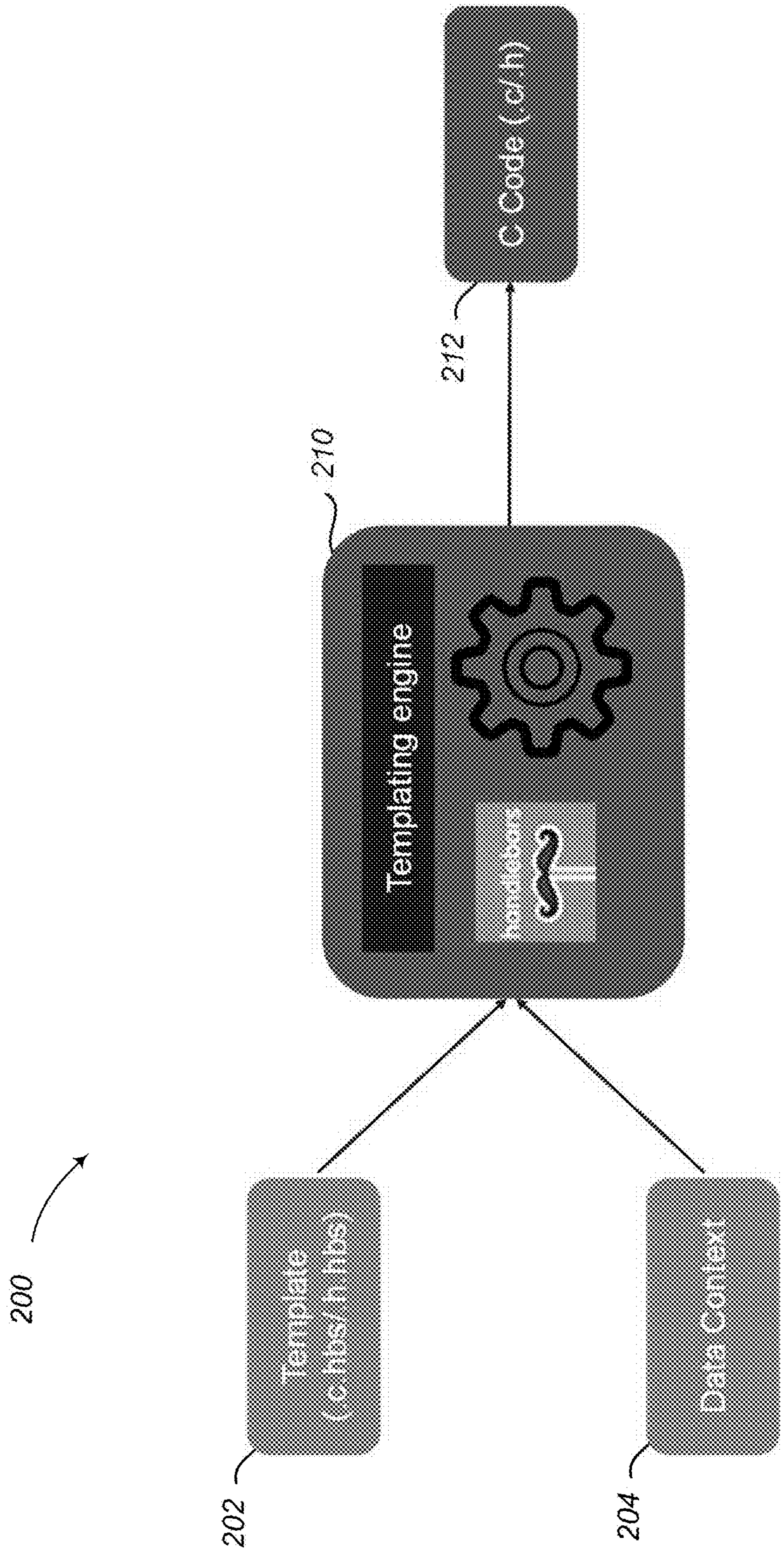
FIG. 2 illustrates an example process for generating source code using a code generation and feedback service.

FIG. 2 illustrates an example process 200 for generating source code using, at least in part, the code generation and feedback service 106. At block 202, template(s) or other code generation guiding framework is obtained. At block 204, data context that will be fed into, paired with, or otherwise associated with the template(s) are obtained. In various embodiments, obtaining the data context includes obtaining user configuration(s) via a GUI. At block 210, one or more templating engine(s) parses through the template(s) in association with the data context, and generates source code based on target language grammar, convention, standard, or other requirements. At block 212, the generated source code is presented, stored, or otherwise used.

Figure 3:
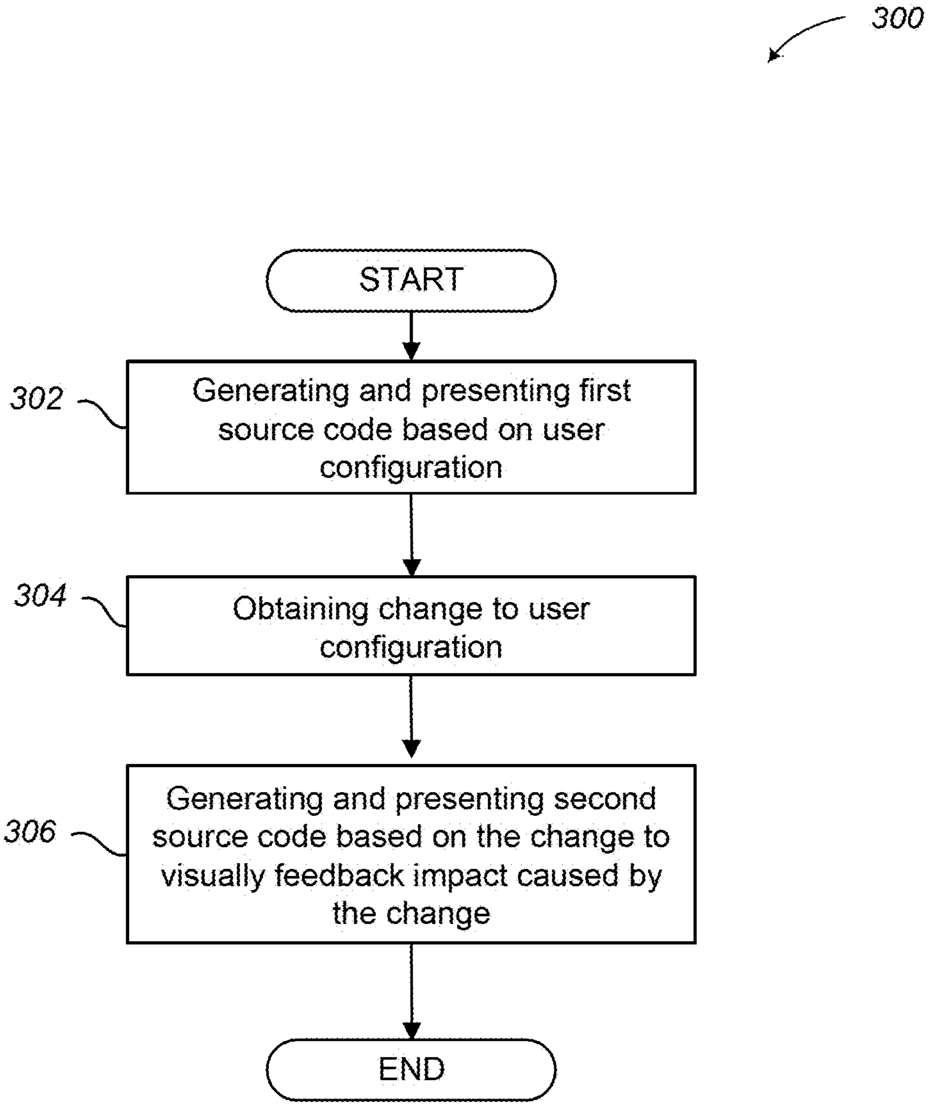
FIG. 3 illustrates a flow diagram of an example process for facilitating live feedback on source code generation, according to some embodiments.

FIG. 3 illustrates a flow diagram of an example process 300 for facilitating live feedback on source code generation, in accordance with some embodiments of the presently disclosed technology. Illustratively, the process 300 can be implemented by the code generation and feedback service 106, in part or in whole. In some embodiments, at least part of the process 300 is implemented by one or more user devices 102. In some embodiments, at least part of the process 300 is performed in real-time relative to any user configuration change for code generation.

Figure 5:
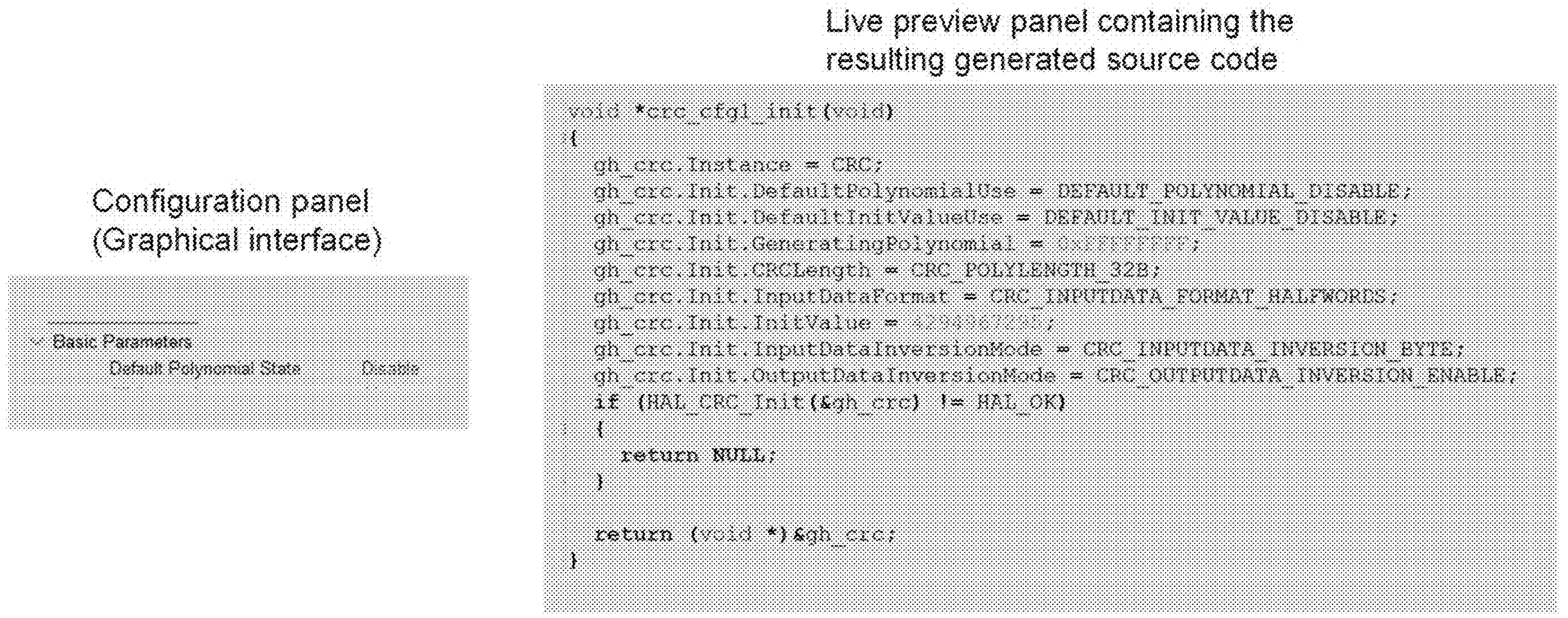
FIG. 5 shows an example of a configuration user interface and an example of a live preview user interface, according to some embodiments.

At block 302, the process 300 includes generating and presenting first source code based on at least one user configuration for code generation. The user configuration can be made via a configuration user interface, and the generated first source code can be presented in a live preview user interface. The configuration user interface and the live preview user interface can be panels, frames, areas, or other contexts of a single display, or can be different and independent displays. The user interface(s) can be generated by the code generation and feedback service 106 and presented through one or more of user devices 102. FIG. 5 shows a configuration panel (on the left) as an example of the configuration user interface including a user configuration—one of the "Basic Parameters," the "Default Polynomial State," has a value of "Disable." FIG. 5 also shows a live preview panel (on the right) as an example of the live preview user interface including at least a part of the source code generated based on the user configuration.

Figure 6:
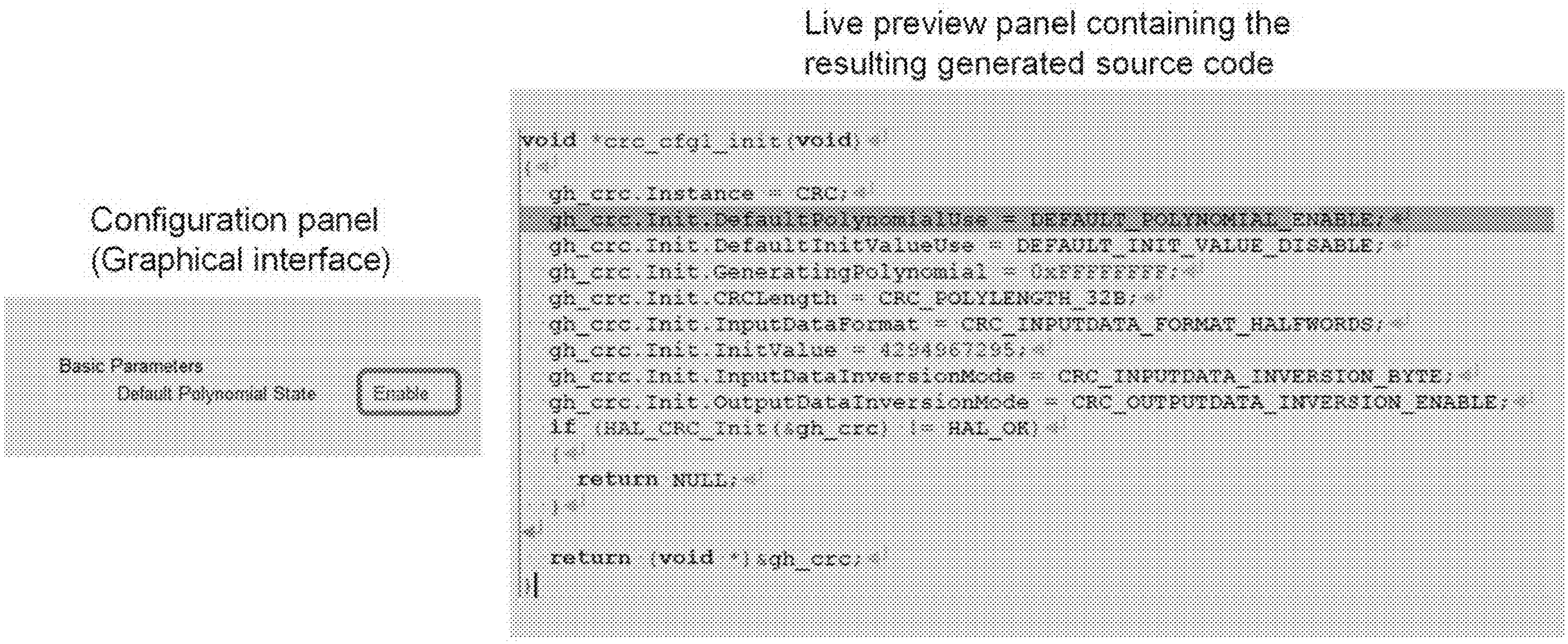
FIG. 6 shows an example of a change made to a user configuration via the configuration user interface and an example of presenting source code generated based thereon, according to some embodiments.

At block 304, the process 300 includes obtaining a change to the user configuration for code generation. The change can be made via the configuration user interface. FIG. 6 shows an example of a change made to the user configuration. More specifically, in the configuration panel (on the left), the "Default Polynomial State" is changed from "Disable" as in FIG. 5 to "Enable" as in FIG. 6. The changed configuration can be highlighted or otherwise presented to distinguish it from other content shown in the configuration user interface, e.g., to signify the change is the last action performed by a user via the configuration user interface.

At block 306, the process 300 includes generating and presenting second source code based on the change to the user configuration, to visually feedback the impact on generated source code caused by the change. Illustratively, the second source code is generated based on user configurations including the change, the difference(s) between the second source code and the first source code is calculated or otherwise determined, and the second source code is presented. FIG. 6 shows an example of the presentation of the second source code via the live preview panel (on the right), which includes highlighted portion(s) corresponding to the difference(s).

The second source code can be presented in the live preview user interface by visually signaling a correspondence between the change to the user configuration and portion(s) of the second source code that are associated with the difference(s) between the second source code and the first source code. This can be done by presenting, in at least one of a same blinking frequency, rhythm or other pattern, same highlight, same format, same size, same font, or same color, both the change to the user configuration and those portion(s) of the second source code. Alternatively or in addition, this can be done by presenting an animation of at least an arrow, line, or connection from the user configuration change to those portion(s) of the second source code. Those portion(s) of the second source code can be presented in a way that is visually distinguished from other portion(s) of the second source code, e.g., in a different blinking frequency, rhythm or other pattern, different highlight, different format, different size, different font, or different color.

Figure 8:
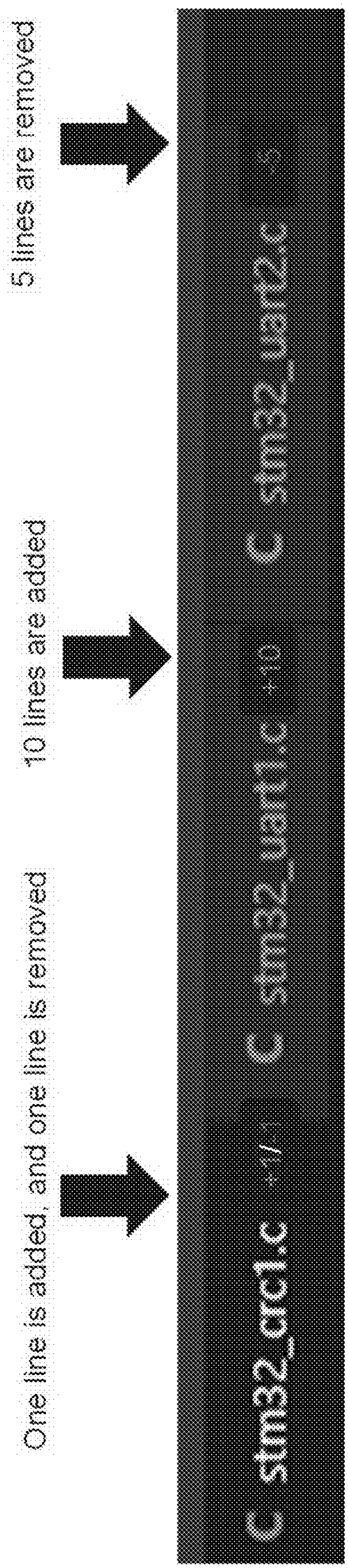
FIG. 8 shows an example of visually indicating source code line changes using identifiers of live preview user interface sub-contexts, according to some embodiments.

In some embodiments, the second source code includes multiple source code files each being shown in a respective tab, sub-panel, sub-frame, or other sub-context of the live preview user interface. FIG. 7 shows an example of displaying multiple source code files via different sub-contexts (e.g., different tabs) of the live preview user interface. In these embodiments, visually distinguishing those portion(s) of the second source code includes visually indicating source code line changes using identifiers of the sub-contexts. FIG. 8 shows an example of visually indicating source code line changes using the identifiers of live preview user interface sub-contexts (e.g., tabs).

Figure 9:
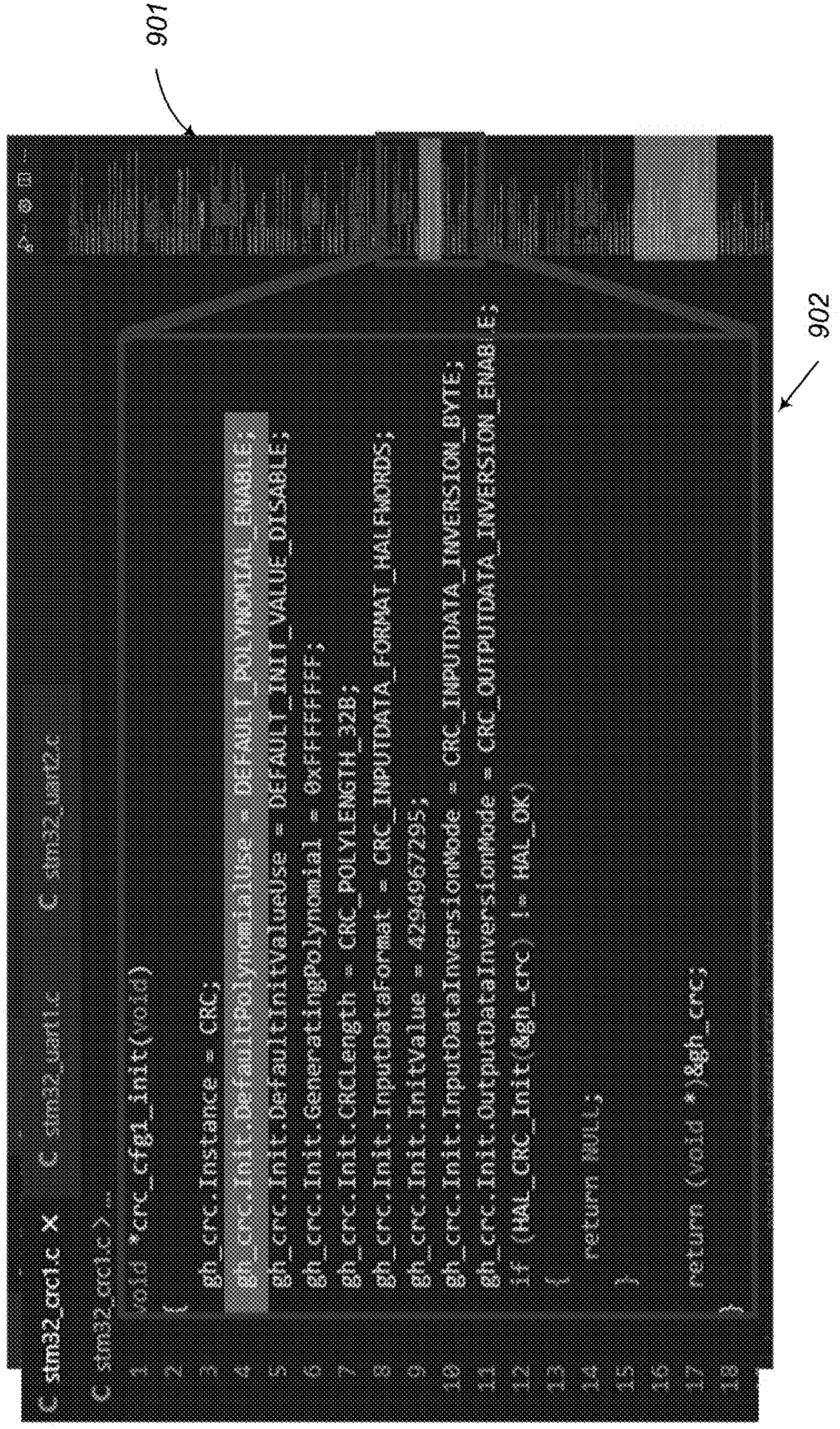
FIG. 9 shows an example of such a minimap as well as how it correlates with the main display area of the live preview interface showing a focused part of source code, according to some embodiments.

In some embodiments, visually distinguishing those portion(s) of the second source code from other portions of the second source code includes presenting a minimap to visually distinguish at least a subset of those portion(s) that would be outside the display range or otherwise hidden in the live preview user interface without the minimap. FIG. 9 shows an example of such a minimap 901 as well as how it correlates with the main display area of the live preview user interface showing a focused part 902 of the second source code.

In some embodiments, the process 300 includes obtaining a second change to at least one user configuration for code generation, e.g., via the configuration user interface. The second change can be a temporally subsequent change to the same user configuration in block 304, a temporally concurrent or temporally partially overlapping change to a different user configuration, or a temporally subsequent change to a different user configuration. The second change can be displayed in a different manner (in a different blinking frequency, rhythm or other pattern, different highlight, different format, different size, different font, or different color, or different sub-context of the configuration user interface) than the change in block 304.

Responsive to obtaining the second change, a third source code can be generated based on user configuration including the second change. Difference(s) between the third source code and at least one of the first source code or the second source code can be calculated or otherwise determined, and the third source code can be presented (e.g., in the live preview user interface). Presenting the third source code can include visually signaling a correspondence between the second change and portion(s) of the third source code that are associated with the difference(s) and/or visually distinguishing those portion(s) of the third source code from other portions of the third source code.

In some embodiments, presenting the third source code in the live preview user interface includes incorporating or otherwise retaining the second source code within the third source code and visually distinguishing of the portion(s) of the second source code that are associated with the difference(s) between the second source code and the first source code from other portions of the second source code. In some embodiments, the presenting of the third source code and the presenting of the second source code are independent and/or concurrent, e.g., via their respective sub-contexts of the live preview user interface.

Those skilled in the art will appreciate that the various operations depicted via FIGS. 2 and 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
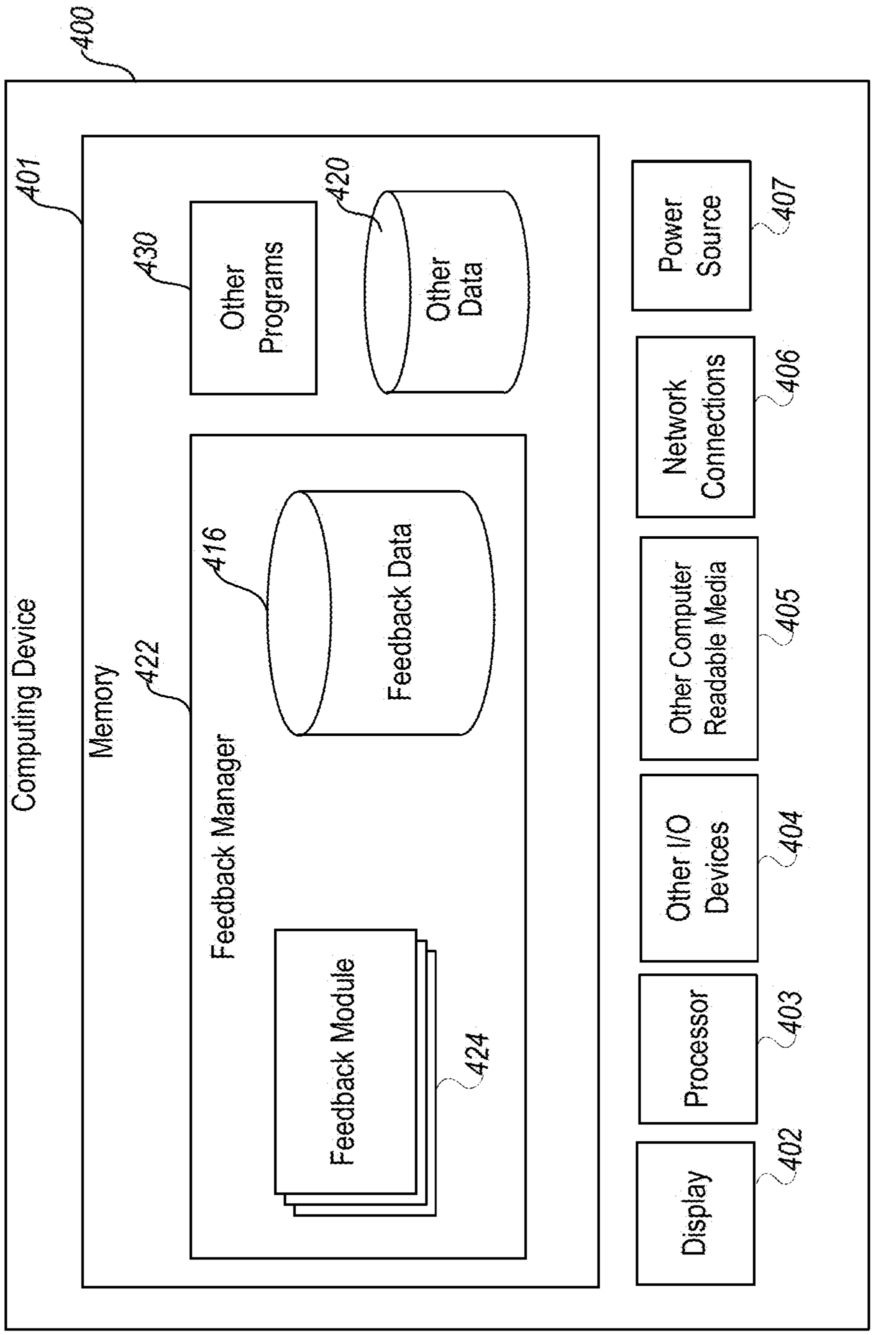
FIG. 4 is a block diagram illustrating elements of an example computing device or system utilized according to some embodiments.

FIG. 4 is a block diagram illustrating elements of an example computing device or system 400 utilized in accordance with some embodiments of the techniques described herein. Illustratively, the computing device 400 corresponds to a computing device implementing the code generation and feedback service 106, or at least a part thereof. In some embodiments, the computing device 400 corresponds to a user device 102.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the feedback manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units (CPU) or other processors 403, Input/Output (I/O) devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The feedback manager 422 is shown residing in memory 401. In other embodiments, some portion of the contents and some, or all, of the components of the feedback manager 422 may be stored on and/or transmitted over the other computer-readable media 405. The components of the computing device 400 and feedback manager 422 can execute on one or more processors 403 and implement applicable functions described herein. In some embodiments, the feedback manager 422 may operate as, be part of, or work in conjunction and/or cooperation with other software applications stored in memory 401 or on various other computing devices. In some embodiments, the feedback manager 422 also facilitates communication with peripheral devices via the I/O devices 404, or with another device or system via the network connections 406.

The one or more feedback modules 424 is configured to perform actions related, directly or indirectly, to the source code generation, presentation and feedback as described herein. In some embodiments, the feedback module(s) 424 stores, retrieves, or otherwise accesses at least some feedback-related data on some portion of the feedback data storage 416 or other data storage internal or external to the computing device 400. In various embodiments, at least some of the feedback modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and feedback manager 422 include Application Programming Interfaces (API(s)) that provides programmatic access to add, remove, or change one or more functions of the computing device 400. In some embodiments, components/modules of the computing device 400 and feedback manager 422 are implemented using standard programming techniques. For example, the feedback manager 422 may be implemented as an executable running on the processor(s) 403, along with one or more static or dynamic libraries. In other embodiments, the computing device 400 and feedback manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the feedback manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a feedback manager 422 implementation. Also, other functions could be implemented and/or performed by each component/module, and in different orders, and by different components/modules, yet still achieve the functions of the computing device 400 and feedback manager 422.

In addition, programming interfaces to the data stored as part of the computing device 400 and feedback manager 422, can be available by standard mechanisms such as through C, C++, C#, and Java APIs; libraries for accessing files, databases, or other data repositories; scripting languages such as Extensible Markup Language (XML); or Web servers, File Transfer Protocol (FTP) servers, Network File System (NFS) file servers, or other types of servers providing access to stored data. The feedback data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to Transmission Control Protocol/Internet Protocol (TCP/IP) sockets, Remote Procedure Call (RPC), Java Remote Method Invocation (RMI), Hypertext Transfer Protocol (HTTP), and Web Services (XML-RPC, Java API for XML-based RPC (JAX-RPC), Simple Object Access Protocol (SOAP), and the like). Other variations are possible. Other functionality could also be provided by each component/module, or existing functionality could be distributed amongst the components/modules in different ways, yet still achieve the functions of the feedback manager 422.

Furthermore, in some embodiments, some or all of the components of the computing device 400 and feedback manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a Digital Versatile Disk (DVD) or flash memory device) so as to enable or configure the computer-readable medium and/or one or more associated computing systems or devices to execute or otherwise use, or provide the contents to perform, at least some of the described techniques.

In some embodiments, a computer-implemented method of facilitating live feedback on code generation includes: generating first source code based on at least one user configuration for code generation made via a configuration user interface; presenting the generated first source code in a live preview user interface; and obtaining, via the configuration user interface, a first change to the at least one user configuration for code generation. The method also includes responsive to the obtaining of the first change to the at least one user configuration: generating second source code based on the first change to at least one user configuration for code generation; computing one or more differences between the second source code and the first source code; and presenting the second source code in the live preview user interface by: visually signaling a correspondence between the first change to the at least one user configuration for code generation and one or more portions of the second source code that are associated with the one or more differences between the second source code and the first source code; and visually distinguishing the one or more portions of the second source code that are associated with the one or more differences between the second source code and the first source code from other portions of the second source code.

In some embodiments, visually signaling a correspondence between the first change to the at least one user configuration for code generation and one or more portions of the second source code that are associated with the one or more differences between the second source code and the first source code comprises presenting, in at least one of a same blinking pattern, highlight, font, or color, both the first change to the at least one user configuration for code generation and the one or more portions of the second source code.

In some embodiments, visually signaling a correspondence between the first change to the at least one user configuration for code generation and one or more portions of the second source code that are associated with the one or more differences between the second source code and the first source code comprises presenting an animation of at least an arrow, line, or connection from the first change to the at least one user configuration for code generation to the one or more portions of the second source code.

In some embodiments, the method further includes obtaining, via the configuration user interface, a second change to the at least one user configuration for code generation; and responsive to the obtaining of the second change to the at least one user configuration: generating third source code based on the second change to the at least one user configuration for code generation; computing one or more differences between the third source code and at least one of the first source code or the second source code; and presenting the third source code in the live preview user interface by: visually signaling a correspondence between the second change to the at least one user configuration for code generation and one or more portions of the third source code that are associated with the one or more differences between the third source code and the at least one of the first source code or the second source code; and visually distinguishing the one or more portions of the third source code that are associated with the one or more differences between the third source code and the at least one of the first source code or the second source code from other portions of the third source code.

In some embodiments, presenting the third source code in the live preview user interface comprises retaining, in the presenting of the third source code, the visually distinguishing of the one or more portions of the second source code that are associated with the one or more differences between the second source code and the first source code from other portions of the second source code. In some embodiments, the presenting of the third source code and the presenting of the second source code are independent and concurrent, via respective sub-contexts of the live preview user interface.

In some embodiments, the second source code includes a plurality of source code files each corresponding to respective sub-context of the live preview user interface, and wherein visually distinguishing the one or more portions of the second source code includes visually indicating source code line changes with one or more identifiers of the sub-contexts.

In some embodiments, visually distinguishing the one or more portions of the second source code from other portions of the second source code includes presenting a minimap to visually distinguishing at least a subset of the one or more portions that would be hidden in the live preview user interface without the minimap.

In some embodiments, a non-transitory computer-readable medium stores contents that cause one or more processors to perform actions. The actions include: generating first source code based on at least one user configuration for code generation made via a configuration user interface; presenting the generated first source code in a live preview user interface; and obtaining, via the configuration user interface, a first change to the at least one user configuration for code generation. The actions also include responsive to the obtaining of the first change to the at least one user configuration: generating second source code based on the first change to at least one user configuration for code generation; computing one or more differences between the second source code and the first source code; and presenting the second source code in the live preview user interface by: visually signaling a correspondence between the first change to the at least one user configuration for code generation and one or more portions of the second source code that are associated with the one or more differences between the second source code and the first source code; and visually distinguishing the one or more portions of the second source code that are associated with the one or more differences between the second source code and the first source code from other portions of the second source code.

In some embodiments, visually signaling a correspondence between the first change to the at least one user configuration for code generation and one or more portions of the second source code that are associated with the one or more differences between the second source code and the first source code comprises presenting, in at least one of a same blinking pattern, highlight, font, or color, both the first change to the at least one user configuration for code generation and the one or more portions of the second source code.

In some embodiments, visually signaling a correspondence between the first change to the at least one user configuration for code generation and one or more portions of the second source code that are associated with the one or more differences between the second source code and the first source code comprises presenting an animation of at least an arrow, line, or connection between the first change to the at least one user configuration for code generation and the one or more portions of the second source code.

In some embodiments, the actions further include: obtaining, via the configuration user interface, a second change to the at least one user configuration for code generation; and responsive to the obtaining of the second change to the at least one user configuration: generating third source code based on the second change to the at least one user configuration for code generation; computing one or more differences between the third source code and at least one of the first source code or the second source code; and presenting the third source code in the live preview user interface by: visually signaling a correspondence between the second change to the at least one user configuration for code generation and one or more portions of the third source code that are associated with the one or more differences between the third source code and the at least one of the first source code or the second source code; and visually distinguishing the one or more portions of the third source code that are associated with the one or more differences between the third source code and the at least one of the first source code or the second source code from other portions of the third source code.

In some embodiments, presenting the third source code in the live preview user interface comprises retaining, in the presenting of the third source code, the visually distinguishing of the one or more portions of the second source code that are associated with the one or more differences between the second source code and the first source code from other portions of the second source code. In some embodiments, the presenting of the third source code and the presenting of the second source code are independent and concurrent, via respective sub-contexts of the live preview user interface.

In some embodiments, the second source code includes a plurality of source code files each corresponding to respective sub-context of the live preview user interface, and wherein visually distinguishing the one or more portions of the second source code includes visually indicating source code line changes with one or more identifiers of the sub-contexts.

In some embodiments, visually distinguishing the one or more portions of the second source code from other portions of the second source code includes presenting a minimap to visually distinguishing at least a subset of the one or more portions that would be hidden in the live preview user interface without the minimap.

In some embodiments, a system includes one or more processors and a computing device coupled to the one or more processors and configured to perform actions. The actions include: generating first source code based on at least one user configuration for code generation made via a configuration user interface; presenting the generated first source code in a live preview user interface; and obtaining, via the configuration user interface, a first change to the at least one user configuration for code generation. The actions also include responsive to the obtaining of the first change to the at least one user configuration: generating second source code based on the first change to at least one user configuration for code generation; computing one or more differences between the second source code and the first source code; and presenting the second source code in the live preview user interface by: visually signaling a correspondence between the first change to the at least one user configuration for code generation and one or more portions of the second source code that are associated with the one or more differences between the second source code and the first source code; and visually distinguishing the one or more portions of the second source code that are associated with the one or more differences between the second source code and the first source code from other portions of the second source code. In some embodiments, visually signaling a correspondence between the first change to the at least one user configuration for code generation and one or more portions of the second source code that are associated with the one or more differences between the second source code and the first source code comprises presenting, in at least one of a same blinking pattern, highlight, font, or color, both the first change to the at least one user configuration for code generation and the one or more portions of the second source code.

In some embodiments, visually signaling a correspondence between the first change to the at least one user configuration for code generation and one or more portions of the second source code that are associated with the one or more differences between the second source code and the first source code comprises presenting an animation of at least an arrow, line, or connection between the first change to the at least one user configuration for code generation and the one or more portions of the second source code.

In some embodiments, the actions further include: obtaining, via the configuration user interface, a second change to the at least one user configuration for code generation; and responsive to the obtaining of the second change to the at least one user configuration: generating third source code based on the second change to the at least one user configuration for code generation; computing one or more differences between the third source code and at least one of the first source code or the second source code; and presenting the third source code in the live preview user interface by: visually signaling a correspondence between the second change to the at least one user configuration for code generation and one or more portions of the third source code that are associated with the one or more differences between the third source code and the at least one of the first source code or the second source code; and visually distinguishing the one or more portions of the third source code that are associated with the one or more differences between the third source code and the at least one of the first source code or the second source code from other portions of the third source code.

In some embodiments, presenting the third source code in the live preview user interface comprises retaining, in the presenting of the third source code, the visually distinguishing of the one or more portions of the second source code that are associated with the one or more differences between the second source code and the first source code from other portions of the second source code. In some embodiments, the presenting of the third source code and the presenting of the second source code are independent and concurrent, via respective sub-contexts of the live preview user interface.

In some embodiments, the second source code includes a plurality of source code files each corresponding to respective sub-context of the live preview user interface, and wherein visually distinguishing the one or more portions of the second source code includes visually indicating source code line changes with one or more identifiers of the sub-contexts.

In some embodiments, visually distinguishing the one or more portions of the second source code from other portions of the second source code includes presenting a minimap to visually distinguishing at least a subset of the one or more portions that would be hidden in the live preview user interface without the minimap.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method of facilitating live feedback on code generation, the method comprising:

generating first source code based on at least one user configuration for code generation made via a configuration user interface;

presenting the generated first source code in a live preview user interface;

obtaining, via the configuration user interface, a first change to the at least one user configuration for code generation; and responsive to the obtaining of the first change to the at least one user configuration:

generating second source code based on the first change to at least one user configuration for code generation;
computing one or more differences between the second source code and the first source code; and
presenting the second source code in the live preview user interface by:
visually signaling a correspondence between the first change to the at least one user configuration for code generation and one or more portions of the second source code that are associated with the one or more differences between the second source code and the first source code; and
visually distinguishing the one or more portions of the second source code that are associated with the one or more differences between the second source code and the first source code from other portions of the second source code, wherein the method further comprises:
obtaining, via the configuration user interface, a second change to the at least one user configuration for code generation; and
responsive to the obtaining of the second change to the at least one user configuration:
generating third source code based on the second change to the at least one user configuration for code generation;
computing one or more differences between the third source code and at least one of the first source code or the second source code; and
presenting the third source code in the live preview user interface by:
visually signaling a correspondence between the second change to the at least one user configuration for code generation and one or more portions of the third source code that are associated with the one or more differences between the third source code and the at least one of the first source code or the second source code; and
visually distinguishing the one or more portions of the third source code that are associated with the one or more differences between the third source code and the at least one of the first source code or the second source code from other portions of the third source code.

2. The method of claim 1, wherein visually signaling a correspondence between the first change to the at least one user configuration for code generation and one or more portions of the second source code that are associated with the one or more differences between the second source code and the first source code comprises presenting, in at least one of a same blinking pattern, highlight, size, font, or color, both the first change to the at least one user configuration for code generation and the one or more portions of the second source code.

3. The method of claim 1, wherein visually signaling a correspondence between the first change to the at least one user configuration for code generation and one or more portions of the second source code that are associated with the one or more differences between the second source code and the first source code comprises presenting an animation of at least an arrow, line, or connection from the first change to the one or more portions of the second source code.

4. The method of claim 1, wherein presenting the third source code in the live preview user interface comprises retaining, in the presenting of the third source code, the visually distinguishing of the one or more portions of the second source code that are associated with the one or more differences between the second source code and the first source code from other portions of the second source code.

5. The method of claim 1, wherein the presenting of the third source code and the presenting of the second source code are independent, via respective sub-contexts of the live preview user interface.

6. The method of claim 1, wherein the second source code includes a plurality of source code files each corresponding to respective sub-context of the live preview user interface, and wherein visually distinguishing the one or more portions of the second source code includes visually indicating source code line changes with one or more identifiers of the sub-contexts.

7. The method of claim 1, wherein visually distinguishing the one or more portions of the second source code from other portions of the second source code includes presenting a minimap to visually distinguishing at least a subset of the one or more portions that would be hidden in the live preview user interface without the minimap.

8. A non-transitory computer-readable medium storing contents that cause one or more processors to perform actions comprising:
generating first source code based on at least one user configuration for code generation made via a configuration user interface;
presenting the generated first source code in a live preview user interface;
obtaining, via the configuration user interface, a first change to the at least one user configuration for code generation; and
responsive to the obtaining of the first change to the at least one user configuration:
generating second source code based on the first change to at least one user configuration for code generation;
computing one or more differences between the second source code and the first source code; and
presenting the second source code in the live preview user interface by:
visually signaling a correspondence between the first change to the at least one user configuration for code generation and one or more portions of the second source code that are associated with the one or more differences between the second source code and the first source code; and
visually distinguishing the one or more portions of the second source code that are associated with the one or more differences between the second source code and the first source code from other portions of the second source code, wherein the actions further comprise:
obtaining, via the configuration user interface, a second change to the at least one user configuration for code generation; and
responsive to the obtaining of the second change to the at least one user configuration:
generating third source code based on the second change to the at least one user configuration for code generation;
computing one or more differences between the third source code and at least one of the first source code or the second source code; and
presenting the third source code in the live preview user interface by:
visually signaling a correspondence between the second change to the at least one user configuration for code generation and one or more portions of the third source code that are associated with the one or more differences between the third source code and the at least one of the first source code or the second source code; and visually distinguishing the one or more portions of the third source code that are associated with the one or more differences between the third source code and the at least one of the first source code or the second source code from other portions of the third source code.

9. The computer-readable medium of claim 8, wherein visually signaling a correspondence between the first change to the at least one user configuration for code generation and one or more portions of the second source code that are associated with the one or more differences between the second source code and the first source code comprises presenting, in at least one of a same blinking pattern, highlight, font, or color, both the first change to the at least one user configuration for code generation and the one or more portions of the second source code.

10. The computer-readable medium of claim 8, wherein visually signaling a correspondence between the first change to the at least one user configuration for code generation and one or more portions of the second source code that are associated with the one or more differences between the second source code and the first source code comprises presenting an animation of at least an arrow, line, or connection between the first change to the at least one user configuration for code generation and the one or more portions of the second source code.

11. The computer-readable medium of claim 8, wherein presenting the third source code in the live preview user interface comprises retaining, in the presenting of the third source code, the visually distinguishing of the one or more portions of the second source code that are associated with the one or more differences between the second source code and the first source code from other portions of the second source code.

12. The computer-readable medium of claim 8, wherein the presenting of the third source code and the presenting of the second source code are independent and concurrent, via respective sub-contexts of the live preview user interface.

13. The computer-readable medium of claim 8, wherein the second source code includes a plurality of source code files each corresponding to respective sub-context of the live preview user interface, and wherein visually distinguishing the one or more portions of the second source code includes visually indicating source code line changes with one or more identifiers of the sub-contexts.

14. The computer-readable medium of claim 8, wherein visually distinguishing the one or more portions of the second source code from other portions of the second source code includes presenting a minimap to visually distinguishing at least a subset of the one or more portions that would be hidden in the live preview user interface without the minimap.

15. A system, comprising:

one or more processors; and a computing device coupled to the one or more processors and configured to perform actions comprising:

generating first source code based on at least one user configuration for code generation made via a configuration user interface;

presenting the generated first source code in a live preview user interface;

obtaining, via the configuration user interface, a first change to the at least one user configuration for code generation; and responsive to the obtaining of the first change to the at least one user configuration:

generating second source code based on the first change to at least one user configuration for code generation;

computing one or more differences between the second source code and the first source code; and presenting the second source code in the live preview user interface by:

visually signaling a correspondence between the first change to the at least one user configuration for code generation and one or more portions of the second source code that are associated with the one or more differences between the second source code and the first source code; and visually distinguishing the one or more portions of the second source code that are associated with the one or more differences between the second source code and the first source code from other portions of the second source code, wherein the actions further comprise:

obtaining, via the configuration user interface, a second change to the at least one user configuration for code generation; and responsive to the obtaining of the second change to the at least one user configuration:

generating third source code based on the second change to the at least one user configuration for code generation;

computing one or more differences between the third source code and at least one of the first source code or the second source code; and presenting the third source code in the live preview user interface by:

visually signaling a correspondence between the second change to the at least one user configuration for code generation and one or more portions of the third source code that are associated with the one or more differences between the third source code and the at least one of the first source code or the second source code; and visually distinguishing the one or more portions of the third source code that are associated with the one or more differences between the third source code and the at least one of the first source code or the second source code from other portions of the third source code.

16. The system of claim 15, wherein visually signaling a correspondence between the first change to the at least one user configuration for code generation and one or more portions of the second source code that are associated with the one or more differences between the second source code and the first source code comprises presenting, in at least one of a same blinking pattern, highlight, font, or color, both the first change to the at least one user configuration for code generation and the one or more portions of the second source code.

17. The system of claim 15, wherein visually signaling a correspondence between the first change to the at least one user configuration for code generation and one or more portions of the second source code that are associated with the one or more differences between the second source code and the first source code comprises presenting an animation of at least an arrow, line, or connection between the first change to the at least one user configuration for code generation and the one or more portions of the second source code.

18. The system of claim 15, wherein presenting the third source code in the live preview user interface comprises retaining, in the presenting of the third source code, the visually distinguishing of the one or more portions of the second source code that are associated with the one or more differences between the second source code and the first source code from other portions of the second source code.

19. The system of claim 15, wherein the presenting of the third source code and the presenting of the second source code are independent and concurrent, via respective sub-contexts of the live preview user interface.

20. The system of claim 15, wherein the second source code includes a plurality of source code files each corresponding to respective sub-context of the live preview user interface, and wherein visually distinguishing the one or more portions of the second source code includes visually indicating source code line changes with one or more identifiers of the sub-contexts.

21. The system of claim 15, wherein visually distinguishing the one or more portions of the second source code from other portions of the second source code includes presenting a minimap to visually distinguishing at least a subset of the one or more portions that would be hidden in the live preview user interface without the minimap.

* * * * *